United States Patent
Wiemker et al.

(10) Patent No.: US 7,349,569 B2
(45) Date of Patent: Mar. 25, 2008

(54) METHOD AND DEVICE FOR FORMING AN ISOLATED VISUALIZATION OF BODY STRUCTURES

(75) Inventors: Rafael Wiemker, Kisdorf (DE); Thomas Blaffert, Hamburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 650 days.

(21) Appl. No.: 10/497,404

(22) PCT Filed: Dec. 6, 2002

(86) PCT No.: PCT/IB02/05236
§ 371 (c)(1),
(2), (4) Date: Jun. 2, 2004

(87) PCT Pub. No.: WO03/049040
PCT Pub. Date: Jun. 12, 2003

(65) Prior Publication Data
US 2005/0036679 A1    Feb. 17, 2005

(30) Foreign Application Priority Data
Dec. 7, 2001   (DE) ................ 101 60 206

(51) Int. Cl.
G06K 9/00 (2006.01)
G06K 9/40 (2006.01)
G06K 9/42 (2006.01)

(52) U.S. Cl. ...................... 382/154; 382/260
(58) Field of Classification Search ........... 382/128, 382/131, 132, 154, 164, 173, 254, 257, 260–264, 382/274, 276; 600/407
See application file for complete search history.

(56) References Cited

U.S. PATENT DOCUMENTS 5,570,404 A    10/1996  Liang et al.

(Continued)

FOREIGN PATENT DOCUMENTS

WO    WO 01/54065 A1    7/2001

OTHER PUBLICATIONS

Armato, et al.; Automated detection of pulmonary nodules in helical computed tomography images of the thorax; SPIE;1998; 3338: 916-919.

(Continued)

Primary Examiner—Amir Alavi (57) ABSTRACT

The invention relates to a method of forming an isolated visualization of body structures from a 3D image data set, which method includes the steps of forming a binary data set in which all image elements contained in the 3D image data set are classified as image elements which are to be visualized in isolated form and image elements which are not to be visualized, where filtering of the image values is performed by means of limit values of the image values and all image elements of the binary data set of image structures contained in the 3D image data set which are smaller than a predetermined size are selected, of forming a filtered data set by entering the image values of the original 3D image data set for the image elements which are characterized as image elements to be visualized in isolated form in the binary data set, and of forming the visualization of the isolated body structure from the filtered data set. The invention also relates to a device for carrying out the described method and also to programming means which carry out the described steps when executed on a computer.

10 Claims, 4 Drawing Sheets

U.S. PATENT DOCUMENTS

| | | |
|---|---|---|
| 5,782,762 A | 7/1998 | Vining |
| 5,832,134 A | 11/1998 | Avinash et al. |
| 5,903,664 A | 5/1999 | Hartley et al. |
| 5,920,319 A | 7/1999 | Vining et al. |
| 6,272,366 B1 | 8/2001 | Vining |
| 6,396,939 B1* | 5/2002 | Hu et al. ............... 382/128 |
| 2001/0021264 A1 | 9/2001 | Armato et al. |
| 2002/0028006 A1 | 3/2002 | Novak et al. |
| 2002/0114530 A1* | 8/2002 | Duarte ................. 382/254 |
| 2004/0022424 A1* | 2/2004 | Seissler et al. ......... 382/128 |
| 2005/0036679 A1* | 2/2005 | Wiemker et al. ........ 382/173 |
| 2005/0190955 A1* | 9/2005 | Brown ................. 382/128 |
| 2006/0235288 A1* | 10/2006 | Lavi .................. 600/407 |
| 2007/0003124 A1* | 1/2007 | Wood et al. ........... 382/131 |

OTHER PUBLICATIONS

Fan, et al.; Automatic Detection of Lung Nodules from Multi-slice Low-dose CT Images; SPIE; 2001;4322:1828-1835.

Pekar, et al.; Fast Detection of Meaningful Isosurfaces for Volume Data Visualization; IEEE; 2001;pp. 223-230.

Pudney, Chris; Distance-Ordered Homotopic Thinning;1998; Computer Vision and Image Understanding; 72:404-413.

Sun, Yi; Small Vessel Enhancement in MRA Images Using Local Maximum Mean Processing; IEEE; 2001; 10:1687-1699.

Wiemker, et al.; Optimal Thresholding for 3D Segmentation of Pulmonary Nodules in High Resolution CT; 2001; Proc. of Comp. Asst. Radiology CARS; pp. 611-616.

* cited by examiner

METHOD AND DEVICE FOR FORMING AN ISOLATED VISUALIZATION OF BODY STRUCTURES

This application is a 371 of PCT/IB02/05236 Dec. 6, 2002.

The invention relates to a method, a device and a computer program for forming an isolated visualization of body structures from a three-dimensional image data set.

Methods of visualizing body structures are known. Contemporary medical diagnostic techniques utilize various imaging methods as a function of the relevant examination. Tomographic methods, such as computed tomography and magnetic resonance tomography, have become very important nowadays; such methods regularly visualize the entire body or parts thereof in the form of a plurality of separate slice images situated at a distance from one another. The physician can then obtain an impression of the three-dimensional situation of the structures in the body by observing a plurality of slice images.

In the slice images the body structures having mutually different properties in relation to the relevant imaging method are distinguished from one another by way of different image values such as grey values, colors or by other graphic distinction means.

Because of the high resolution rates of contemporary methods, tomographic images regularly contain a mass of information. This information content is further increased by the application of contemporary techniques such as administration of contrast agents, marker technologies and the superposition of images acquired by means of different techniques. Therefore, various methods are known which reduce the information content of tomographic images by controlled filtering, thus enabling the physician to make a reliable diagnosis and/or, for example, a clear, three-dimensional image within an acceptable period of time.

The steps customarily carried out for the filtering of body images are steps such as slice selection or contrast selection. It is also known to filter the image by choosing a limit value. The limit value divides the image values into image values which are to be visualized and those which are not to be visualized. A differentiated selection of image values to be visualized can be carried out by defining upper and lower limit values.

WO 01/54065 discloses a method which serves to detect conspicuous nodule structures in the lung by way of a substantially automated approach. According to this method a segmentation of the lung is performed by means of a plurality of successive filtering operations on the basis of a limit value and also contour detection operations; image elements are then counted so as to determine the size of the segmented structures and to isolate possibly pathological structures. The method presents the physician with a reduced image data set which contains the suspect structures found by the program and hence constitutes a diagnostic aid. This method has the drawback that it requires a complex calculation for the detection any lung anomalies and that a pre-evaluated data set is presented to the physician. The physician, however, often does not appreciate such a type of automated pre-evaluation, because the physician can then no longer control which structures are removed.

The described method may constitute a given aid for the physician while reviewing body images, thus facilitating the diagnosis. However, it is a drawback that the physician can derive an overview of given body structures in the three-dimensional image data set only at the expense of a period of time whose duration is hard to accept. Therefore, there is a need for a digital method which presents the physician with a pre-filtered data set which, however, has not yet been pre-evaluated in respect of pathologies, thus enabling the physician to perform evaluation. Because of the increasing pressures in respect of time and cost, moreover, additional diagnostic aids should not require a large calculation effort and should lead to a reduction of the mass of data.

It is an object of the invention to provide a method and a device which enable isolated visualization of body structures from a 3D image data set.

The object is achieved in accordance with the invention in that the following steps are successively performed on a 3D image data set:

forming a binary data set in which all image elements present in the 3D image data set are subdivided into image elements which are to be visualized in isolated form and image elements which are not to be visualized, where filtering of the image values is performed by means of limit values and all image elements of the binary data set of image structures contained in the 3D image data set which are smaller than a predetermined size are selected, forming a filtered data set by entering the image values of the original 3D image data set for the image elements which are characterized as image elements to be visualized in isolated form in the binary data set, forming the visualization of the isolated body structure from the filtered data set.

The invention is based on the recognition of the fact that it is possible to select the image elements of body structures, notably filigree, finely ramified body structures, by successive application of given filtering operations so as to obtain a reduced data set wherefrom a visualization of the relevant body structure can be formed in a simpler and faster manner.

During the first step of the method a binary data set is formed from the original data set which is acquired by means of a tomographic imaging method, such as computed tomography or magnetic resonance tomography, and contains the body structures as a multitude of image elements having given image values (for example, grey values). In this binary data set all image elements of the 3D image data set are subdivided into image elements to be visualized and image elements which are not to be visualized.

For this subdivision first an image value is determined which serves as a limit value for the subsequent filtering operation. All image elements having an image value which is higher than this limit image value are then assigned the same binary value (for example, 1). All image elements having an image value below this limit image value are assigned a different binary value (for example, 0).

The binary data set thus filtered is filtered further in a second step of the method in such a manner that the binary value of all image elements forming image structures of a size which is smaller than a given, predetermined size is changed. Structures having, for example, an image value 1 after the limit value filtering can thus be filtered out so that they have an image value 0 after the second filtering step.

In the sub-divided binary data set thus formed all image elements which are required for the visualization of the isolated structure have the same image value (for example, 1) whereas all image elements which are not to be visualized have a different image value (for example, 0). From the binary data set thus sub-divided there is formed a filtered data set in which all image elements to be visualized again have their image value as contained in the original data set. To this end, for all image elements which are required for the visualization of the isolated structure (that is, for example, all image elements having the image value 1) the image value is used which was entered for this image element at the corresponding location in the original 3D image data set.

The data set thus filtered contains all image elements, having their original image value, required for the visualization of the isolated structure. The visualization of the isolated body structure can be formed from this data set by means of customary methods (for example, Maximum Intensity Projection).

The method in accordance with the invention offers the advantage that the described successive application of the filtering steps yields a selection of the image elements of the (possibly finely ramified) structure to be visualized without requiring a large calculation effort. The number of selected image elements often amounts to a very small percentage only of the number of image elements contained in the original 3D image data set. Because of this reduction, the required storage space and the calculation effort required for the processing of the image elements are both reduced to a substantial degree. The physician is thus offered a fast and simple imaging method for the evaluation of notably finely ramified structures.

After the filtering, often only a few of the image elements of the original 3D image data set remain so as to form the body structures to be visualized in isolated form. Therefore, for the purpose of data reduction and ease of management of the filtered data set it is often advantageous to form a list of image elements from the filtered data set. This list of image elements contains position data and image values of the image elements of the body structure to be visualized in isolated form. The visualization of the isolated body structures can be readily formed from this list.

As a result of the simplified management and the data reduction, real-time processing can be performed by utilizing the calculation capacities already available in contemporary computers for the processing and evaluation of diagnostic images, thus allowing the physician to change the magnification factor and the viewing direction in real time.

The so-called region growing method can be applied in order to separate the image elements which are to be visualized in isolated fashion from those which are not to be visualized. Given regions of the image, for example, artefact regions, are filtered out for this purpose. To this end, a growth point is manually or automatically set in an artefact region and all image elements which have the same image element value as the growth point and can be reached therefrom without traversing an image element having a different image element value are filtered out. Artefact regions or regions which are situated outside the region fully covered by the imaging method are thus filtered out in a simple and fast manner.

The image elements of image structures which are smaller than a predetermined size are preferably selected by means of the so-called morphological opening method or the distance transformation method. The image elements of small structures which are necessary for the visualization of the finely ramified structure can thus be selected from the pre-filtered data set by means of a fast method.

During a first step of the morphological opening method the entire image region is scanned by means of a template of the appropriate size in order to filter out structures which are smaller than a predetermined size so that all image structures which do not completely fill the template in one or more directions are filtered out. Because a given amount has been filtered out from the edge region of the large image structures still present after the filtering during the first filtering step, these large structures in the edge region are enlarged again by this given amount in a second step.

According to the distance transformation method each image elements is assigned a distance value which describes the distance between the image element and the nearest neighboring image element having a different image value. This results in a relief image in which image elements at the center of large structures have large distance values whereas image elements in small structures have small distance values. Small structures can be filtered out by filtering out the image elements with small distance values. In this method the edge of the large structures remaining after the filtering again has to be enlarged by a given amount during a second step.

In order to increase the speed of processing, the distance transformation method preferably involves a distance transformation with an integer type chamfer distance.

The image data is customarily presented in the form of a 3D image data set. This image data set is advantageously processed by means of the method in accordance with the invention in such a manner that the image data is dealt with in slices. From the 3D image data set there are formed slice images which may be arranged in an arbitrary manner and may also be transformed. The image elements in the individual slice images are pixels in this case. The individual slice images are then processed in such a manner that a respective binary data set is formed from each of these slice images and the various filtering steps as described above are carried out. The individual slice images can then be processed in succession or in parallel. When filtered data sets have been formed from the slice images, these data sets are combined again so as to form a filtered 3D image data set. The isolated visualization of the body structures can be formed from this filtered 3D image data set in the same way as described above and/or the image data can first be transferred to a list of image elements.

Known visualization methods can be used for the visualization of the image elements. A visualization method of this kind is the Maximum Intensity Projection (MIP) method. In accordance with the MIP method the image element having the maximum image value on a virtual line of sight which emanates from the eye of the observer is searched so as to be visualized.

Another known visualization method is the Closest Vessel Projection (CVP) method. According to the CVP method, the image element which is situated closest to the eye on a virtual line of sight emanating from the eye of the observer is searched so as to be selected for visualization. A large number of lines of sight is then followed in the form of a grid of the image, the number of lines of sight being dependent on the resolution of the image data set and/or on the image resolution desired by the observer.

When in accordance with the method of the invention the filtered image data set is taken up in a list which contains the space co-ordinates and image values of all image elements to be visualized in isolated form, visualization methods of the kind set forth can be advantageously applied in inverted form. According to such an inverted form of application, instead of dealing with the lines of sight in the direction from the virtual eye of the observer towards the image elements, the lines of sight are treated while proceeding from the image element in the direction of the virtual eye of the observer. Because the list of image elements of the body structures to be visualized in isolated form often contains only few image elements, the number of lines of sight to be dealt with can be reduced and hence also the required calculation effort. Faster processing of the image data can thus be achieved.

In order to achieve a further reduction of the required amount of calculation effort, the image elements which are situated on the relevant line of sight during the treatment of a line of sight can be characterized during the visualization of the image elements of the image data set or the list of image elements. The image elements thus characterized need no longer be treated during later processing steps of the visualization.

The invention also relates to a device for forming an isolated visualization of body structures from a 3D image data set, which device includes means for forming a binary data set in which all image elements present in the 3D image data set are subdivided into image elements which are to be visualized in isolated form and image elements which are not to be visualized, filter means for selecting image values by means of limit values of the image values, means for selecting all image elements of the binary data set of image structures contained in the 3D image data set which are smaller than a predetermined size, means for forming a filtered data set by entering the image values of the original 3D image data set for the image elements which are characterized as image elements to be visualized in isolated form in the binary data set, and display means for forming the visualization of the isolated body structure from the filtered data set.

The invention also relates to a computer program for forming an isolated visualization of body structures from a 3D image data set, which program includes program means which carry out the steps of the method disclosed in claim 1 when executed on a computer.

The computer program includes program means for
  forming a binary data set from a 3D image data set,
  filtering the image elements by means of limit values of the image element values,
  selecting image elements of image structures smaller than a given size,
  forming a filtered data set, and
  forming a visualization of an isolated body structure.

The program means carry out the steps of the method disclosed in claim 1 when executed on a computer.

A preferred embodiment of the invention will be described in detail hereinafter with reference to the Figures. Therein.

Figure 1:
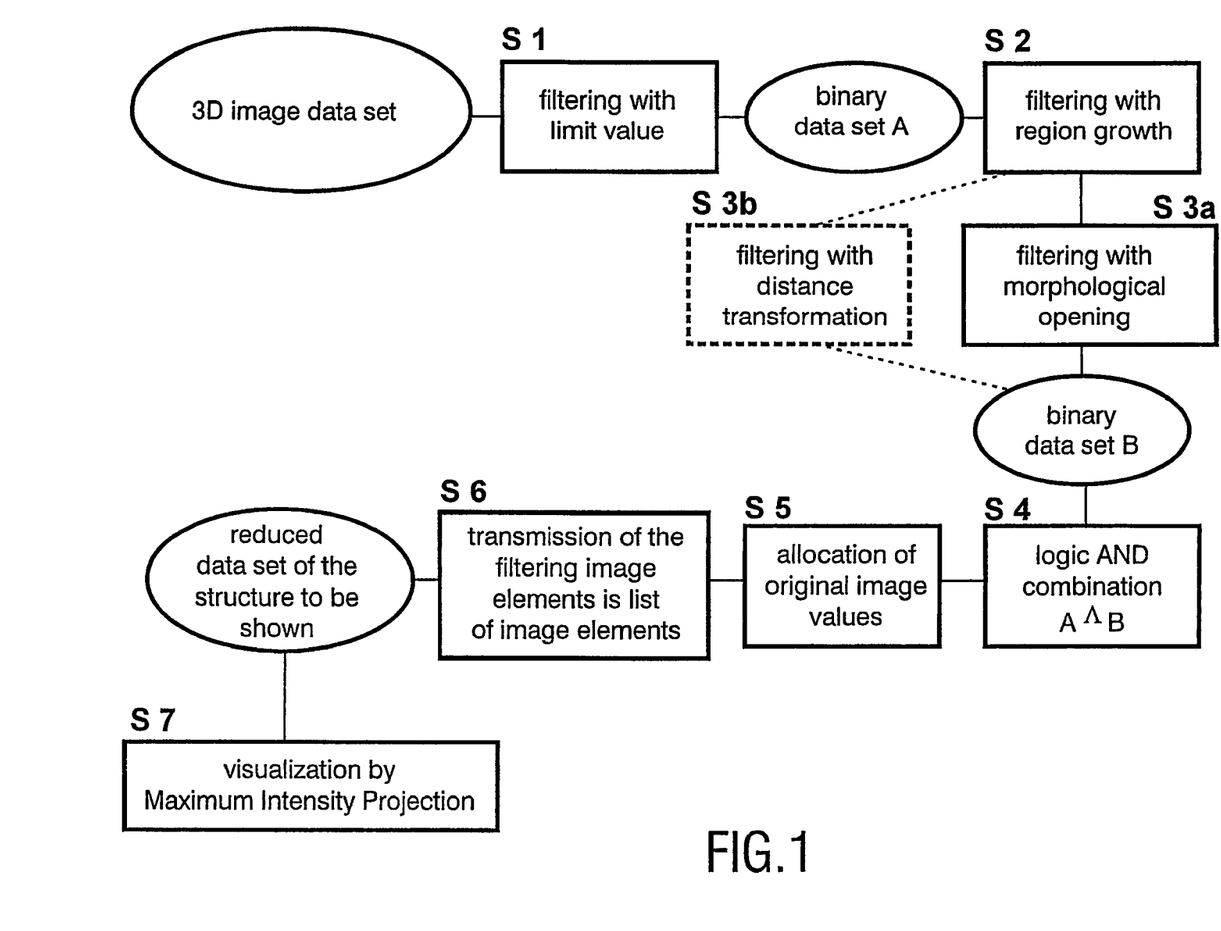
FIG. 1 shows a flow chart of the method in accordance with the invention.

Referring to FIG. 1, the input data for the preferred version of the method in accordance with the invention is formed by the image data of a three-dimensional data set of the thorax. The data set was acquired by way of a computed tomography exposure. An image value is associated with each image element in this 3D image data set. This image value is regularly represented as the CT number or the so-called Hounsfield unit which is a measure of the attenuation value of the tissue in relation to the attenuation value of water.

The 3D image data set is subdivided into a plurality of horizontally situated slice images. These slice images are individually processed in conformity with the method of the invention.

Figure 2:
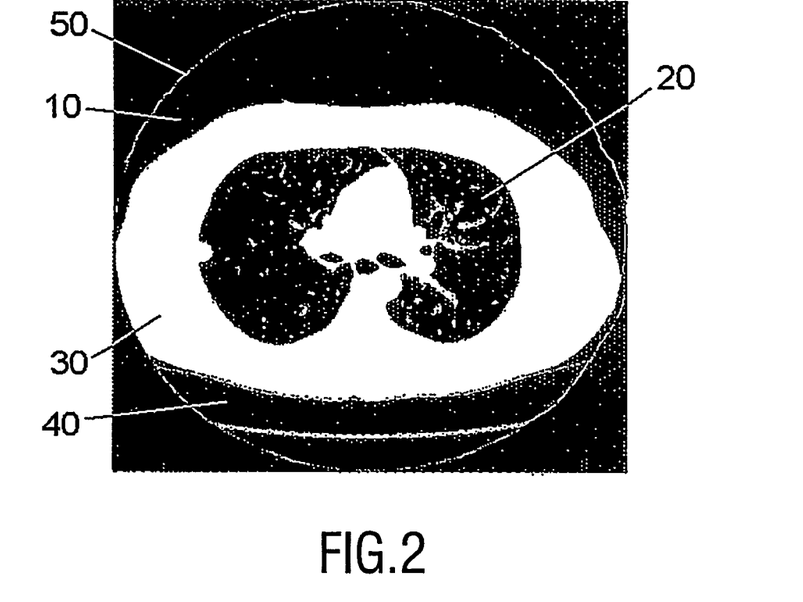
FIG. 2 shows a two-dimensional slice image of a binary data set of the thorax after filtering while using a limit value of −400 HU.

In a first step of the method (S1 in FIG. 1) filtering is performed while using a given HU as the limit value. The image value of all image elements having a value HU which is smaller than this limit value, preferably amounting to −400 HU for the visualization of lung structures, are set to 0 and the image value of all image elements larger than this limit value are set to 1. As appears from FIG. 2, after this step body structures 30 such as bones, fat, liver and blood have been set to 1, whereas the air 10 surrounding the body, the air present in the lungs and the lung parenchyma tissue 20 have been set to 0.

Figure 3:
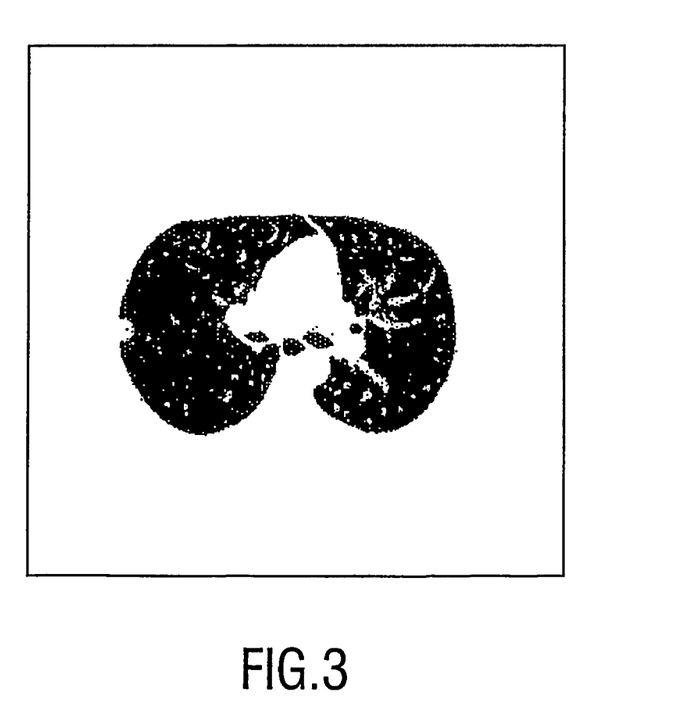
FIG. 3 shows a two-dimensional slice image of the binary image data set of FIG. 2 after filtering by means of the region growing method from the four corners of the image.

During a subsequent step of the method (S2 in FIG. 1), a region growth is started, that is, from four growth points which are set in the four corners of the slice images. However, it is also possible to set more or less than four growth points. The growth points are set in such a manner that an image element in a region set to 0 is set to 1. Subsequently, all image elements surrounding the relevant image element and also having the value 0 are set to 1 and the region growth is continued as from each of these image elements. The entire air space around the body of the patient, including the mat 40 on which the patient is arranged, and the circular noise ring 50 surrounding the body are set to 1. This step of the method results in a binary representation as shown in FIG. 3.

Further growth points can be set at option in structures, such as respiratory tracts, which are recognized as small regions with a very small HU (near −1000 HU). The region growing method also sets small respiratory tracts to 1 in this manner.

Subsequent to this region growing step of the method, all small lung structures which are smaller than a given size are set to 0 in a further step of the method (S3a, S3b in FIG. 1). The morphological opening method can then be applied (S3a in FIG. 1). According to this method the binary slice image is gridded by means of a structure element, such as a circle having a given diameter, which is so large that it can contain the lung structures of interest which are smaller than the given size. The image elements of all structures which do not completely fill the structure element are then set to 0. All structures which are twice as large as the structure element (or the diameter of the circle) are also set to 0. Moreover, in the edge region of all structures which are more than twice as large as the structure element an edge zone of a thickness corresponding to the size of the structure element is set to 1. Therefore, in a step of the method which succeeds the gridding operation all remaining structures in the edge zone are enlarged again by the amount corresponding to the size of the structure element.

This step may also utilize the distance transformation method (S3b in FIG. 1) as an alternative for the morphological opening method. According to the distance transformation method each image element is assigned an image value which corresponds to the distance between the relevant image element and the nearest image element having a different image value. As a result of this assignment, a relief-like image is formed from the binary slice image; in this relief image the image elements of the edge zone of large structures and the image elements of small structures have low values, whereas image elements from the center of large structures have high values. When all image elements smaller than a given value are set to 0, small structures can thus be completely set to zero, whereas in the case of large structures merely an edge zone is set to zero. The latter can be undone again during a subsequent step, that is, by enlarging the remaining structures again in the same way as in the morphological opening method.

Figure 4:
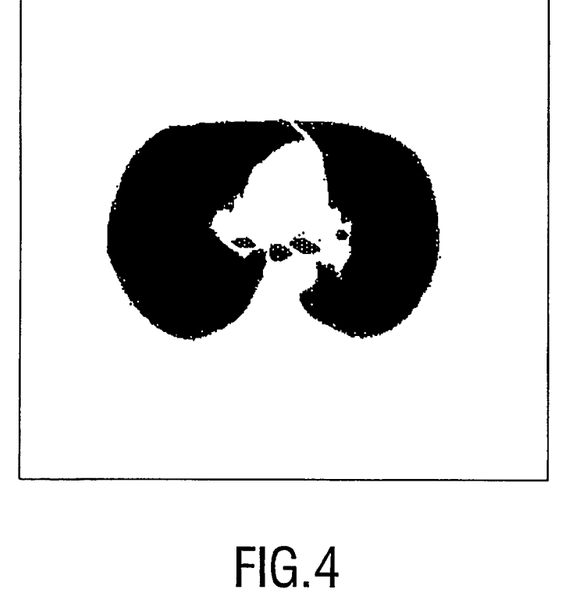
FIG. 4 shows a two-dimensional slice image of the binary image data set of FIG. 3 after the filtering out of all structures smaller than a given size.

This step of the method results in a binary representation as shown in FIG. 4.

After the above filtering operations have been carried out, the image elements to be visualized in isolated form can be selected by way of logic AND combination (S4 in FIG. 1). This operation is performed in such a manner that all those image elements are selected which on the one hand have the value 0 in the binary data set (binary data set B in FIG. 1) obtained after the last step of the morphological opening (or distance transformation) method, and which also have the value 1 in the binary data set (binary data set A in FIG. 1) obtained after the first step of the method for the filtering by means of a limit value.

Figure 5:
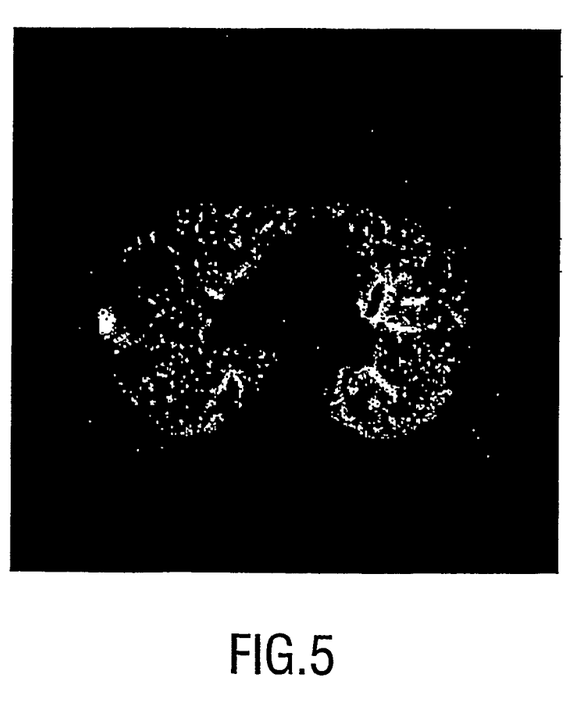
FIG. 5 shows a two-dimensional slice image of the image elements to be visualized in isolated form.

A visualization of the binary data set as shown in FIG. 5 is then obtained. These image elements (voxels of interest) are again allocated the image value contained in the original 3D image data set for the relevant image element (S5 in FIG. 1).

Subsequently, from the image data set which contains the image elements to be visualized in isolated form and has been formed from the plurality of slice images there is formed a list in which the respective space co-ordinates and image value (S6 in FIG. 1) are entered for each image element.

A list of the voxels (voxels of interest) to be visualized in isolated fashion can thus be formed from a typical data set of a thorax image with 512 slices and a resolution of 0.68 $mm^2 \times 0.6$ $mm^3$ and containing approximately 138 million voxels. This list typically contains less than 1 million voxels, that is, less than 1% of the original amount of data.

Figure 6:
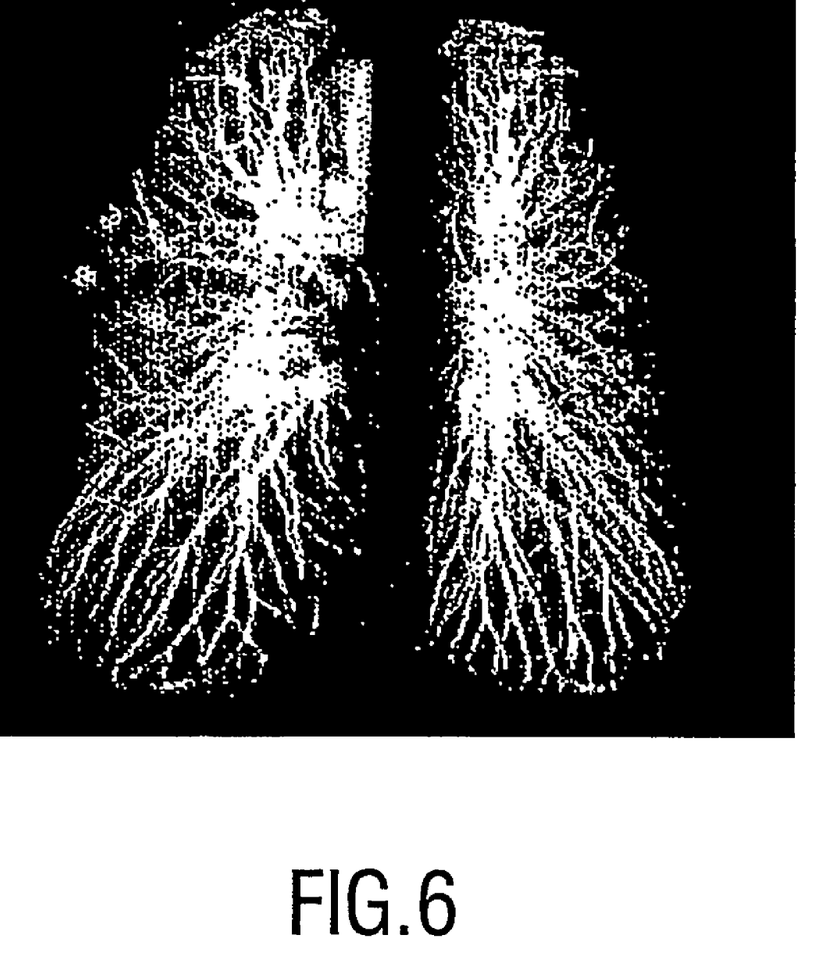
FIG. 6 shows a visualization, utilizing Maximum Intensity Projection, of the image elements of the 3D image data set which are to be visualized in isolated form.

As is shown in FIG. 6, a two-dimensional projection of the three-dimensional structure can be formed from this list by application of maximum intensity projection (MIP). The viewing angle is then calculated for each voxel contained in the list and the voxel which has the highest image value in a viewing direction is determined. The voxel thus determined is then visualized in the two-dimensional projection.

Alternatively, the closest vessel projection (CVP) method can also be used to determine the voxel which is situated nearest to the observer in the viewing direction so as to visualize it in the two-dimensional projection.

In order to provide the observer with a three-dimensional impression or with depth information of the isolated body structure, the viewing angle can be automatically and continuously changed, so that the impression is obtained that the body structure rotates as if it were around a space axis. As a result of the previously described data reduction, the numerous two-dimensional projections of the body structures from different viewing directions which are required for this mode of observation be realize in real time by means of the customarily available calculation capacity. The impression of a uniform and smooth rotation can thus be attained.

It is advantageously possible to realize also a change of the viewing angle and a selection of an image detail (zoom function) which can be controlled by the user. Such user control can take place via the keyboard or the mouse of a computer. Because of the previously described data reduction, the change of viewing angle as controlled by the user as well as the enlargement or reduction of the detail selected by the user can be performed in real time by means of the customarily available calculation capacities. With a view to calculation effort or calculation time it is particularly advantageous when the image elements to be visualized are stored in the form of a list of image elements prior to this calculation.

Should the calculation capacity available in given circumstances not be adequate for calculation in real time, it is also possible to calculate given two-dimensional projections from different viewing directions in a first step while in a second step a visualization with a uniform and smooth rotation of the body structure can be formed while utilizing the previously calculated projections.

In the case of viewing directions pre-calculated in this manner it is again possible to realize a limited form of user control in that the rotations available to the user are limited to rotations around given axes, for example, exclusively around the z axis, and in that the viewing directions possible for this limited rotation are calculated in advance.

The invention claimed is:

1. A method of forming an isolated visualization of body structures from a 3D image data set, which method includes the steps of forming a binary data set in which all image elements present in the 3D image data set are subdivided into image elements to be visualized in isolated form and image elements which are not to be visualized, where a1. filtering of the image values is performed by means of limit values, and a2. all image elements of the binary data set of image structures contained in the 3D image data set which are smaller than a predetermined size are selected, forming a filtered data set by entering the image values of the original 3D image data set for the image elements which are characterized as image elements to be visualized in isolated form in the binary data set, forming the visualization of the isolated body structure from the filtered data set.

2. A method as claimed in claim 1, characterized in that a list of image elements with position data and associated image values of all image elements to be visualized in isolated form is formed from the filtered data set, and that the visualization of the isolated body structure is formed from this list.

3. A method as claimed in claim 2, characterized in that for the visualization of the image elements of the list of image elements a visualization method, notably the Maximum Intensity Projection (MIP) or the Closest Vessel Projection (CVP) method, is applied in inverted form in that the path is followed from an image element contained in the list of image elements to a virtual eye of an observer.

4. A method as claimed in claim 1, characterized in that for the formation of the binary data set the image element regions which are to be visualized in isolated form and those which are not to be visualized are separated from one another by way of the region growth method.

5. A method as claimed in claim 1, characterized in that the morphological opening method is applied so as to select the image element regions which are to be visualized in isolated form and those which are not to be visualized.

6. A method as claimed in claim 1, characterized in that the distance transformation method, preferably involving an integer type chamfer distance, is applied so as to select image element regions which are to be visualized in isolated form and those which are not to be visualized.

7. A method as claimed in claim 1, characterized in that processing of two-dimensional data sets in slices takes place in at least one step of the method, the image elements in these steps of the method being pixels.

8. A method as claimed in claim 1, characterized in that the lungs are visualized in isolated form.

9. A computer readable medium storing a computer program for forming an isolated visualization of body structures from a 3D image data set, which computer program includes program means which carry out the steps of the method disclosed in claim 1 when executed on a computer.

10. A device for forming an isolated visualization of body structures from a 3D image data set, which device includes:

means for forming a binary data set in which all image elements present in the 3D image data set are subdivided into image elements which are to be visualized in isolated form and image elements which are not to be visualized, filter means for selecting image values by means of limit values of the image values, means for selecting all image elements of the binary data set of image structures contained in the 3D image data set which are smaller than a predetermined size, means for forming a filtered data set by entering the image values of the original 3D image data set for the image elements which are characterized as image elements to be visualized in binary form in the binary data set, display means for forming the visualization of the isolated body structure from the filtered data set.

* * * * *